United States Patent
Hartmann

(10) Patent No.: US 11,828,886 B2
(45) Date of Patent: Nov. 28, 2023

(54) COVER ASSEMBLY FOR A SENSOR AND PEDESTRIAN PROTECTION SENSOR FOR A VEHICLE

(71) Applicant: CONTINENTAL AUTOMOTIVE GMBH, Hannover (DE)

(72) Inventor: Rico Hartmann, Sulzbach-Rosenberg (DE)

(73) Assignee: Continental Automotive GmbH, Hannover (DE)

(*) Notice: Subject to any disclaimer, the term of this patent is extended or adjusted under 35 U.S.C. 154(b) by 595 days.

(21) Appl. No.: 17/078,136

(22) Filed: Oct. 23, 2020

(65) Prior Publication Data

US 2021/0041544 A1     Feb. 11, 2021

Related U.S. Application Data

(63) Continuation of application No. PCT/DE2019/200023, filed on Mar. 21, 2019.

(30) Foreign Application Priority Data

Mar. 21, 2018 (DE) .................. 10 2018 206 210.2

(51) Int. Cl.
*G01S 15/931* (2020.01)
*G01S 7/521* (2006.01)

(52) U.S. Cl.
CPC ............ *G01S 7/521* (2013.01); *G01S 15/931* (2013.01)

(58) Field of Classification Search
CPC .............. G01D 11/245; G01S 15/931; G01S 2015/938; G01S 7/521
See application file for complete search history.

(56) References Cited

U.S. PATENT DOCUMENTS

| 6,439,058 B1* | 8/2002 | Aratani ................. G01L 19/003 |
| | | 73/756 |
| 2006/0064955 A1 | 3/2006 | Shimomura |
| 2006/0272430 A1 | 12/2006 | Araki |
| 2011/0068771 A1* | 3/2011 | Ueno ................... G01R 15/202 |
| | | 324/117 R |
| 2016/0195413 A1 | 7/2016 | Bertsch |

(Continued)

FOREIGN PATENT DOCUMENTS

| CN | 1877921 A | 12/2006 |
| CN | 104870963 A | 8/2015 |

(Continued)

OTHER PUBLICATIONS

Machine translation of CN104870963 (Year: 2015).*

(Continued)

*Primary Examiner* — Natalie Huls

(57) ABSTRACT

A cover assembly for a sensor component is provided. The cover assembly includes a sensor housing portion and a cover. The sensor housing portion has a protrusion portion. The protrusion portion has a ramp surface. The cover has a protrusion receptacle and the protrusion portion is arranged in the protrusion receptacle. The cover has a clamping tab where the clamping tab preloads the cover in a removal direction. The protrusion receptacle interlockingly lies against the protrusion portion in the removal direction. Additionally, the clamping tab lies on the ramp surface of the protrusion portion.

17 Claims, 4 Drawing Sheets

(56) References Cited

U.S. PATENT DOCUMENTS

| | | | | |
|---|---|---|---|---|
| 2017/0253369 | A1* | 9/2017 | Mizusaki | B65D 7/42 |
| 2017/0328747 | A1 | 11/2017 | Mikkel | |
| 2017/0328802 | A1* | 11/2017 | Tsubata | G01L 19/14 |
| 2019/0086245 | A1* | 3/2019 | Kim | G01D 11/245 |
| 2020/0400786 | A1* | 12/2020 | Kakimoto | G01V 8/20 |
| 2022/0155774 | A1* | 5/2022 | Laffey | G01D 11/245 |

FOREIGN PATENT DOCUMENTS

| | | | | |
|---|---|---|---|---|
| CN | 107003158 | A | 8/2017 | |
| DE | 2814107 | A1 | 10/1979 | |
| DE | 29805506 | U1 | 6/1998 | |
| DE | 10053681 | A1 | 5/2002 | |
| DE | 10106837 | A1 | 9/2002 | |
| DE | 102008025045 | A1 | 12/2008 | |
| DE | 102008004358 | A1 | 7/2009 | |
| DE | 102008028978 | A1 | 12/2009 | |
| DE | 102009048067 | A1 | 4/2011 | |
| DE | 102013110258 | A1 | 4/2014 | |
| DE | 102013208537 | A1 | 7/2014 | |
| DE | 202014103822 | U1 | 9/2014 | |
| DE | 102013216718 | A1 | 2/2015 | |
| DE | 102013217340 | A1 | 3/2015 | |
| DE | 102014206735 | A1 | 10/2015 | |
| DE | 102015107123 | A1 * | 11/2016 | |
| DE | 102015107123 | A1 | 11/2016 | |
| DE | 102015113192 | A1 | 2/2017 | |
| DE | 102015113192 | A1 * | 2/2017 | B60R 19/483 |
| DE | 202016004442 | U1 | 10/2017 | |
| DE | 202016004443 | U1 | 10/2017 | |
| DE | 102016223278 | A1 | 5/2018 | |
| DE | 102017207563 | A1 | 11/2018 | |
| EP | 1955901 | A1 | 8/2008 | |
| EP | 3205994 | A1 | 8/2017 | |
| JP | 2016164016 | A | 5/1996 | |
| JP | H08135616 | A | 5/1996 | |
| JP | 2001318017 | A | 11/2001 | |
| JP | 6002327 | B2 | 5/2016 | |
| JP | 2017533408 | A * | 11/2017 | G01L 5/221 |
| KR | 20170108228 | A * | 9/2017 | G01L 19/14 |
| WO | 2007140641 | A1 | 12/2007 | |
| WO | 2015024562 | A1 | 2/2015 | |
| WO | 2016087256 | A1 | 6/2016 | |
| WO | 2017182290 | A1 | 10/2017 | |

OTHER PUBLICATIONS

Chinese First Office Action dated Nov. 1, 2021 for the counterpart Chinese Patent Application No. 201980027930.7.

German Search Report dated Nov. 11, 2018 for the counterpart German Application No. 10 2018 206 210.2.

International Search Report and the Written Opinion of the International Searching Authority dated Jun. 6, 2019 for the counterpart PCT Application No. PCT/DE2019/200023.

* cited by examiner

COVER ASSEMBLY FOR A SENSOR AND PEDESTRIAN PROTECTION SENSOR FOR A VEHICLE

CROSS-REFERENCE TO RELATED APPLICATIONS

This application claims the benefit of PCT Application PCT/DE2019/200023, filed Mar. 21, 2019, which claims priority to German Application DE 10 2018 206 210.2, filed Apr. 23, 2018. The disclosures of the above applications are incorporated herein by reference

TECHNICAL FIELD

The disclosure relates to a cover assembly for a sensor. Furthermore, the invention relates to a pedestrian protection sensor as the sensor.

BACKGROUND

In addition to the basic function of a sensor, namely the sensing of measurement variables and the transmission of the same as sensor data, modern sensors must also meet secondary conditions relating in particular to the robust design of the sensors so that the sensors can be used without faults over long periods of time. Sensors for vehicles must be given particular attention, because these sensors are used for many years even under adverse weather conditions. In addition to the robust design, the desire for economical production is also of primary concern so that in international competition not only functionally reliable and robust sensors but also economical sensors can be offered.

The printed publication DE 10 2015 113 192 A1, which probably constitutes the closest prior art, discloses an ultrasonic sensor apparatus for a motor vehicle, that includes an ultrasonic sensor, where the ultrasonic sensor apparatus has a cover device for protecting portions of the ultrasonic sensor. The cover device is executed as a cap which can be caught via latching means and which is preloaded via tabs in a cover region in a removal direction so that the cover device lies fixedly against a base housing in the removal direction.

SUMMARY

The disclosure provides a cover assembly for a sensor which is configured in a functionally reliable manner and has a simplified construction. The disclosure also provides a pedestrian protection sensor that includes the cover assembly.

The disclosure provides a cover assembly which is configured for a sensor component. The cover assembly protects the sensor component, by way of example, against environmental influences or foreign bodies. An inner chamber is defined and protected by the cover assembly as a protection volume, where the sensor component is arranged in the protection volume.

The cover assembly has a sensor housing portion. The sensor housing portion can be configured as a separate portion to a sensor housing, which is connected to the sensor housing. The sensor housing portion may be an integral portion of the sensor housing and is, for example, produced together with the sensor housing by primary forming. For example, the sensor housing portion and/or the sensor housing is/are configured as a one-piece or multipiece plastic injection-molded part.

The cover assembly has a cover, where the cover is connected to the sensor housing portion. For example, the cover is placed on or in the sensor housing portion in a mounting direction and/or is removed from the sensor housing portion in a removal direction. The inner chamber and/or the protection volume is/are arranged between the cover and the sensor housing portion.

For fastening, the sensor housing portion has at least one protrusion portion, for example, precisely two such protrusion portions, where the protrusion portion has a ramp surface. The ramp surface has a gradient, where the gradient is configured in an increasing manner in the mounting direction. In some examples, the ramp surface is configured such that a wider portion is arranged further in the sensor housing portion in the mounting direction, and a narrower portion is arranged less far in the sensor housing portion in the mounting direction.

The cover has a protrusion receptacle, where the protrusion portion is arranged in the protrusion receptacle in a mounted condition of the cover.

In addition, the cover has at least one clamping tab, where the clamping tab preloads the cover in the removal direction so that the cover is pushed into the removal direction. The protrusion receptacle interlockingly lies against the protrusion portion in the removal direction so that, despite the preloading, the cover remains on the sensor housing portion. In some examples, the cover is caught with the sensor housing portion via the protrusion receptacle and/or the protrusion portion. The fact that the clamping tab preloads the cover in the removal direction means that the protrusion receptacle constantly lies against the protrusion portion so that a rattling of the cover in or respectively on the sensor housing portion is avoided.

In some implementations, the clamping tab lies on the ramp surface of the protrusion portion. In addition to the function as a latching device, the protrusion receptacle/protrusion portion functional unit is allocated a function as a clamping device. The two different functions during the securing of the cover in or on the sensor housing portion, namely latching and preloading, are combined in the functional unit. The cover assembly is therefore constructed in a functionally reliable manner due to the realized functions of "latching and preloading", but it can be constructed in a simplified manner due to the pooling of the two functions.

In some implementations, the clamping tab is arranged in the protrusion receptacle. For example, the protrusion receptacle is configured as a U-shaped portion, where the transverse leg interlockingly lies against the protrusion portion and the clamping tab is arranged between the two standing legs. In some examples, the clamping tab and the two standing legs are fastened to a joint connecting portion or are integrally configured. This design underlines the simplified and, in addition, compact construction of the cover assembly.

In some implementations, the sensor housing portion has a contacting surface for contacting the protrusion receptacle in a direction vertical to the mounting and/or to the removal direction. The cover comes to rest during or following the mounting with the protrusion receptacle(s) on the contacting surface(s). In some examples, the cover has two protrusion receptacles and the sensor housing portion has two contacting surfaces, where the contacting surfaces grasp the protrusion receptacles in the manner of a bracket. In some examples, the protrusion portion protrudes from the contacting surface. The protrusion portion may form an elevation to the contacting surface. The protrusion receptacle may abut the contacting surface in regions which are arranged outside of the protrusion portion.

In some implementations, the protrusion receptacle is preloaded in the direction of the contacting surface so that the protrusion receptacle is pressed against the contacting surface. In some examples, if the protrusion portion forms a part of the contacting surface, it is ensured that the interlocking connection between the protrusion receptacle and the protrusion portion cannot be inadvertently opened.

The protrusion portion may have a latching surface and the protrusion receptacle may have a latching complementary surface. In some examples, the latching complementary surface is arranged on the lying leg or transverse leg of the U of the protrusion receptacle. The latching surface is configured such that the protrusion receptacle is guided by the latching surface in the direction of the contacting surface. For example, the latching surface and the contacting surface have an intermediate angle which is configured less than 90°. The latching surface may be configured monotonically decreasing or even strictly monotonically decreasing toward the contacting surface in a longitudinal section vertical to the contacting surface and in the mounting direction or respectively removal direction. The latching surface forms a ramp or a chute for the protrusion receptacle so that the latter is guided automatically in the direction of the contacting surface. In this design, the cover is arranged in a self-retaining manner on the sensor housing portion.

In some implementations, the cover has a spacer element which forms a mechanical end stop for the cover during the mounting in the sensor housing portion. In this way, a minimum volume, such as a protected minimum volume, of the inner chamber constantly remains under the cover so that components to be protected in the inner chamber, such as the sensor component, cannot be damaged during the mounting.

In some structural design examples, the cover is configured in a U shape in a lateral top view. The cover has two side portions and a connecting portion which connects the two side portions. The two side portions each configure a protrusion receptacle as this has been described above. Following an introduction of the cover into the sensor housing portion, the side portions are elastically pivoted with respect to one another until the protrusion portions are introduced into the protrusion receptacles. Subsequently, the side portions swing outwardly again and come to rest on the contacting surface of the sensor housing portion.

The spacer element may be configured on the connecting portion. In a specific design, the spacer element is configured as at least one lateral strip on the connecting portion. Such a strip may be executed on both sides of the connecting portion so that the protected minimum volume is formed between the sensor housing portion, the connecting portion and laterally between the spacer elements.

In some implementations, the cover is configured as a shaped sheet metal part. In this design, the protrusion receptacles may be realized by punching out an inner portion from a sheet metal semi-finished product. The clamping tab may be constituted from the material within the protrusion receptacle.

A further subject-matter of the disclosure relates to a pedestrian protection sensor for a vehicle, which has a cover assembly as has been described above or respectively according to any one of the preceding claims.

The pedestrian protection sensor has an interface for a measuring hose, where a sensor chamber, as a pressure measuring chamber of the pedestrian protection sensor, is fluidically connected or at least coupled to the hose chamber so that, in the event of a deformation of the measuring hose, a pressure change is effected in the sensor chamber. The pedestrian protection sensor has a sensor which detects the pressure change.

The sensor chamber is arranged in a sensor housing, where the sensor housing portion forms a part of the sensor housing or is connected to the latter. The sensor has a membrane device as a sensor component. The sensor chamber is closed off in a pressure-tight manner by the membrane device with respect to the surroundings so that, in the event of a pressure change in the sensor chamber, for example in the event of a deformation of the measuring hose, the membrane device is deflected. The sensor is, furthermore, configured to detect the deflection of the membrane device metrologically.

The membrane device may be arranged in the sensor housing portion and may be covered by the cover. In some examples, the membrane device is arranged in the inner chamber or protection volume which is formed by the cover and the sensor housing portion. The installation space of the membrane device may be limited to the protected minimum volume which is guaranteed by the at least one spacer element.

The details of one or more implementations of the disclosure are set forth in the accompanying drawings and the description below. Other aspects, features, and advantages will be apparent from the description and drawings, and from the claims.

DESCRIPTION OF DRAWINGS

Parts which correspond to one another or which are the same are, in each case, provided with the same reference numerals in the figures.

DETAILED DESCRIPTION

Figure 1:
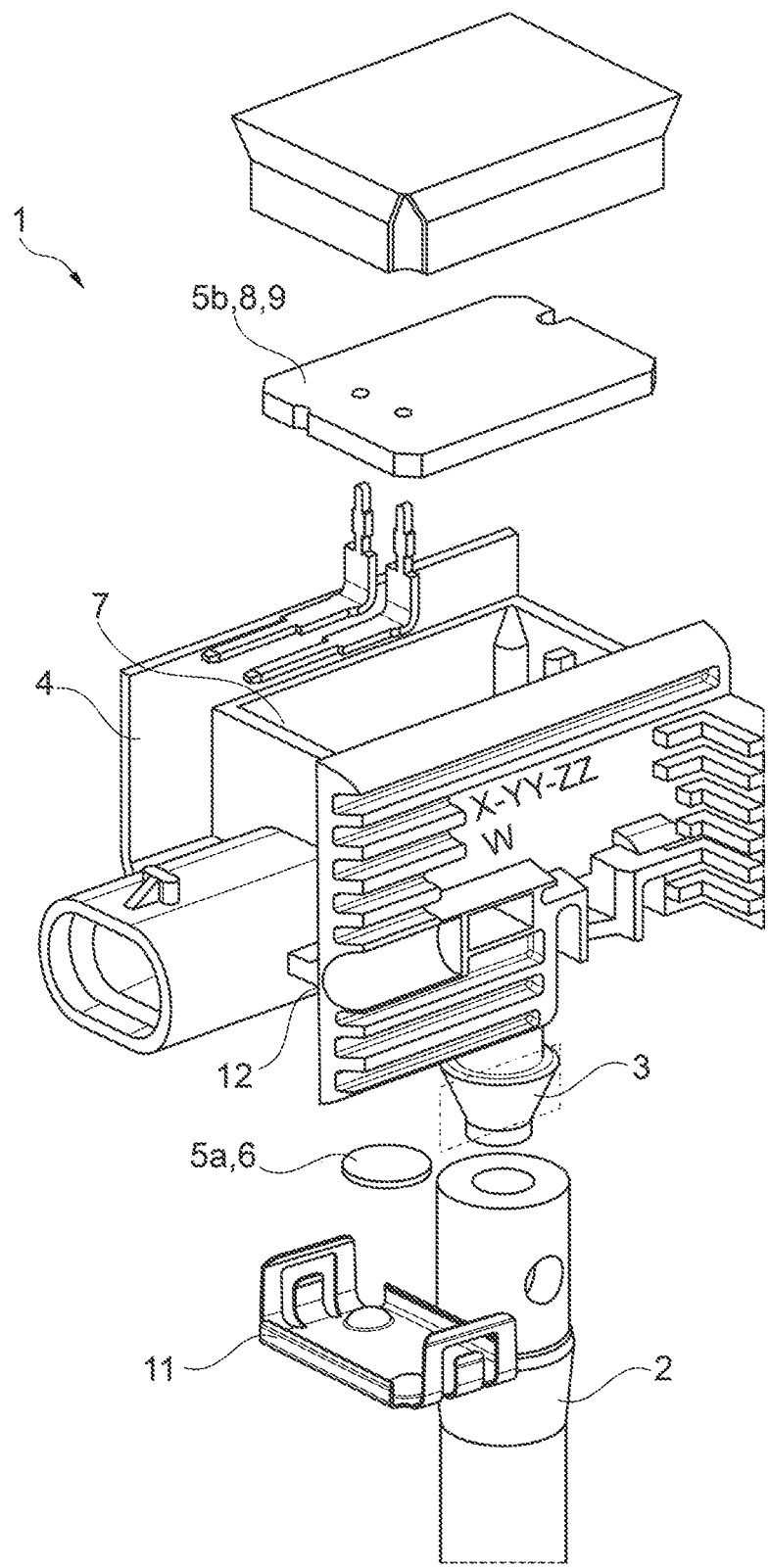
FIG. 1 shows an exploded diagram of an exemplary pedestrian protection sensor.

FIG. 1 shows a pedestrian protection sensor 1 in a schematic, 3-dimensional exploded diagram. The pedestrian protection sensor 1 is fluidically connected to a measuring hose 2 which, in the case of a vehicle, is arranged for example in a front portion. In the event of a collision with a pedestrian, the measuring hose 2 is deformed so that a pressure increase is affected briefly in the measuring hose 2 and, therefore, in the pedestrian protection sensor 1, which pressure increase may be interpreted as a measurement of a pedestrian collision. On the basis of the detected pressure increase or respectively pedestrian collision, rescue measures such as, by way of example, an installation of a hood, etc. can be initiated.

The pedestrian protection sensor 1 has an interface 3 for fluidically coupling to the measuring hose 2. The pedestrian protection sensor 1 has a sensor housing 4, in which sensor components 5 a, b are arranged. A membrane device 6 is thus provided as a sensor component 5 which closes off a sensor chamber 7 in the sensor housing 4 with respect to the surroundings in an airtight manner. In the event of the pressure increase, the membrane device 6 is deflected and/or deformed. A sensor insert 8 is additionally used as a sensor component 5b which includes a printed circuit board 9 and sensors 10 (FIG. 2), where the sensors 10 are configured to detect the deflection or deformation of the membrane device 6 metrologically and to forward it, by way of example, to an evaluation unit.

In a lower region of the diagram, a cover 11 is shown, which can be used in a sensor housing portion 12 and can be caught such that it is prevented from being lost. The cover 11 and the sensor housing portion 12 together form a cover assembly 26.

Figure 2:
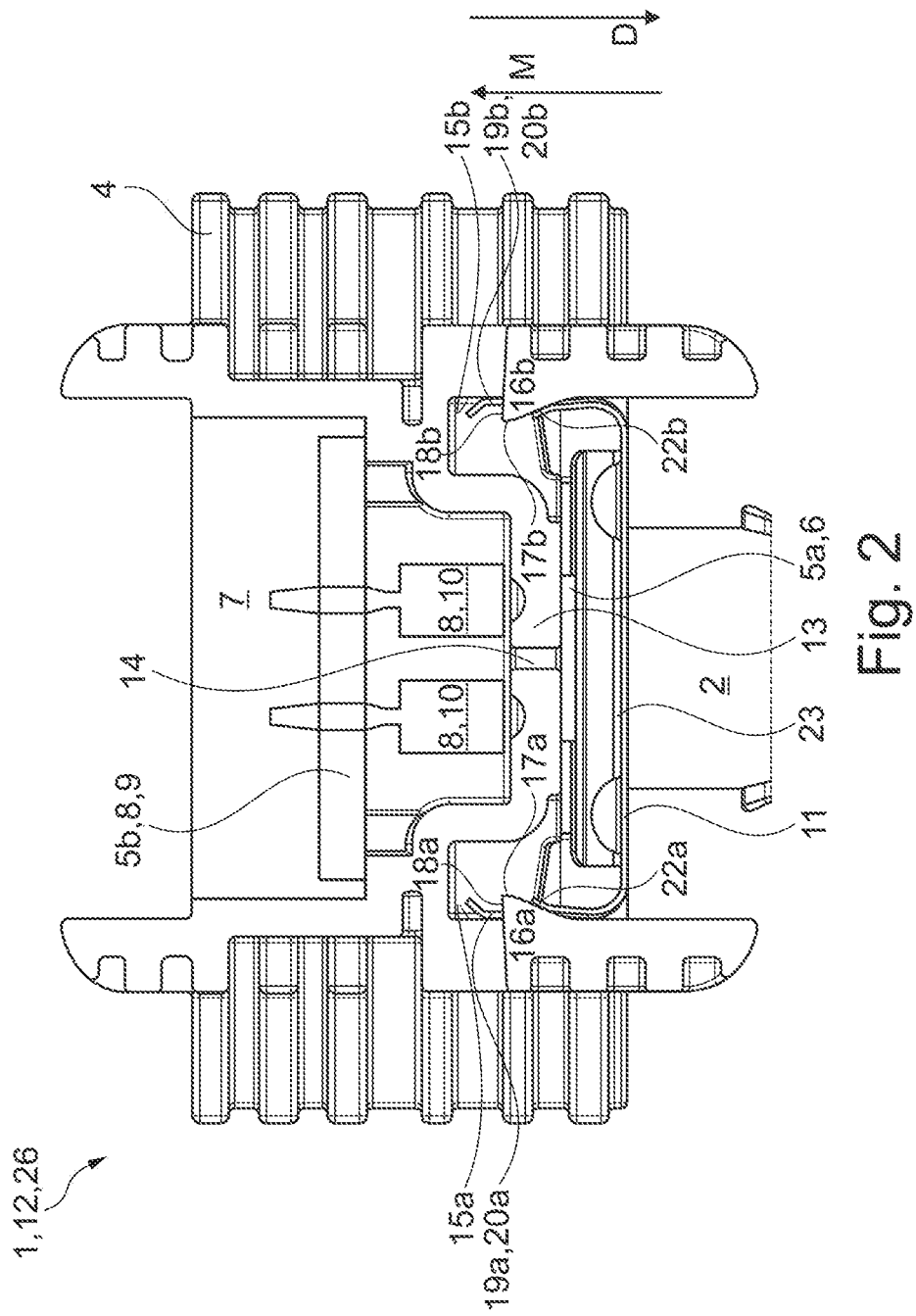
FIG. 2 shows a sectional diagram of the exemplary pedestrian protection sensor in FIG. 1.

FIG. 2 shows a longitudinal section of the pedestrian protection sensor 1 in a detailed representation in the region of the sensor housing portion 12. It can be seen that the sensor housing portion 12 forms a part of the sensor housing 4. The sensor housing portion 12 has a bottom region 13 which isolates the sensor chamber 7 in the sensor housing 4 with respect to the surroundings. In the bottom region 13, a through-opening is introduced 14 which is, however, fluidically sealed by the membrane device 6. The membrane device 6 is configured as a plate element, in this case a circular plate element, and is welded onto the bottom region 14. The sensors 10 are arranged on the turned-away side of the bottom region 13.

The outer membrane device 6 includes a sensitive sensor component 5a which does indeed have to communicate fluidically with the surroundings, however it does have to be protected against external influences or foreign bodies. The sensor housing portion 12 forms a receptacle for the cover 11, where the cover 11 can be inserted into the sensor housing portion 12 in a mounting direction M and can be detached from the sensor housing portion 12 in a removal direction D.

The sensor housing portion 12 has contacting surfaces 15 a, b for the cover 11 on two opposite sides. The contacting surfaces 15 a, b are oriented parallel with respect to one another.

Protrusion portions 16 a, b, which have a triangular form in the longitudinal section shown, protrude from the contacting surfaces 15 a, b. The protrusion portions 16 a, b taper or reduce the free diameter between the contacting surfaces 15 a, b. The protrusion portions 16 a, b each have a ramp surface 17 a, b and a latching surface 18 a, b. The ramp surfaces 17 a, b are oriented with respect to one another and are aligned in a converging manner in the mounting direction M in the longitudinal section shown. The latching surfaces 18 a, b assume an angle, in the longitudinal section shown, with respect to the mounting direction M or the removal direction D, which is less than 90°, where the latching surfaces 18 a, b assume a free intermediate angle of less than 90° with respect to the contacting surfaces 15 a, b.

Figure 4A:
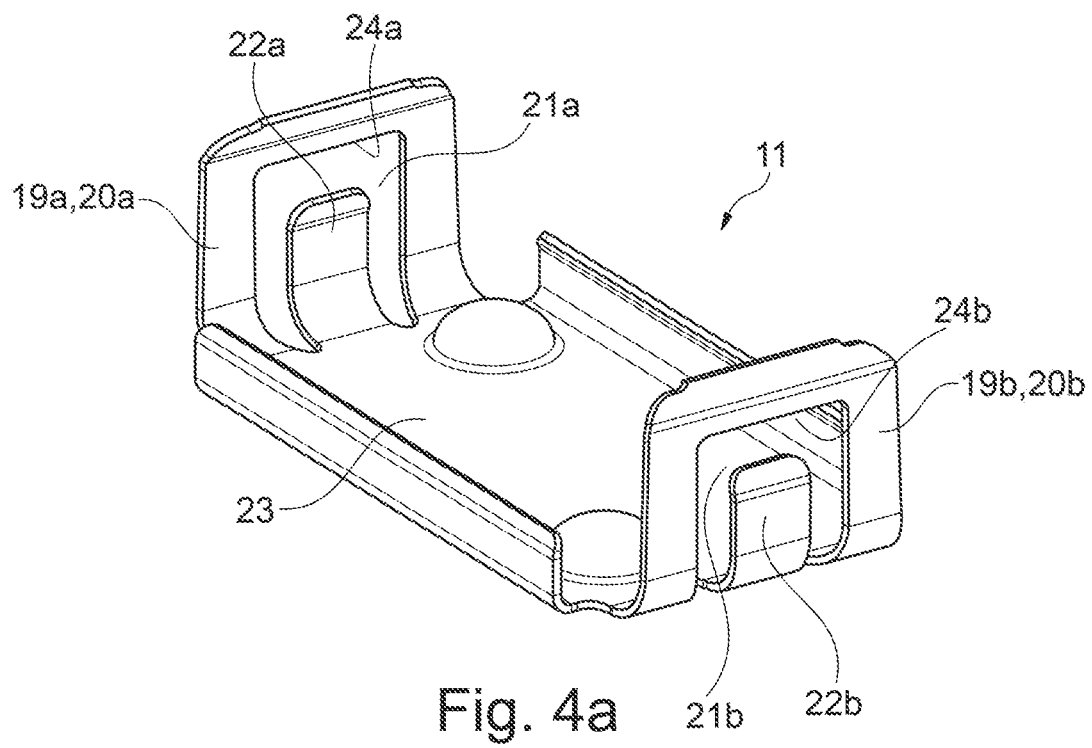
FIGS. 4 a and 4b show the cover of the preceding figure in a 3-dimensional diagram in various views.
Figure 4B:
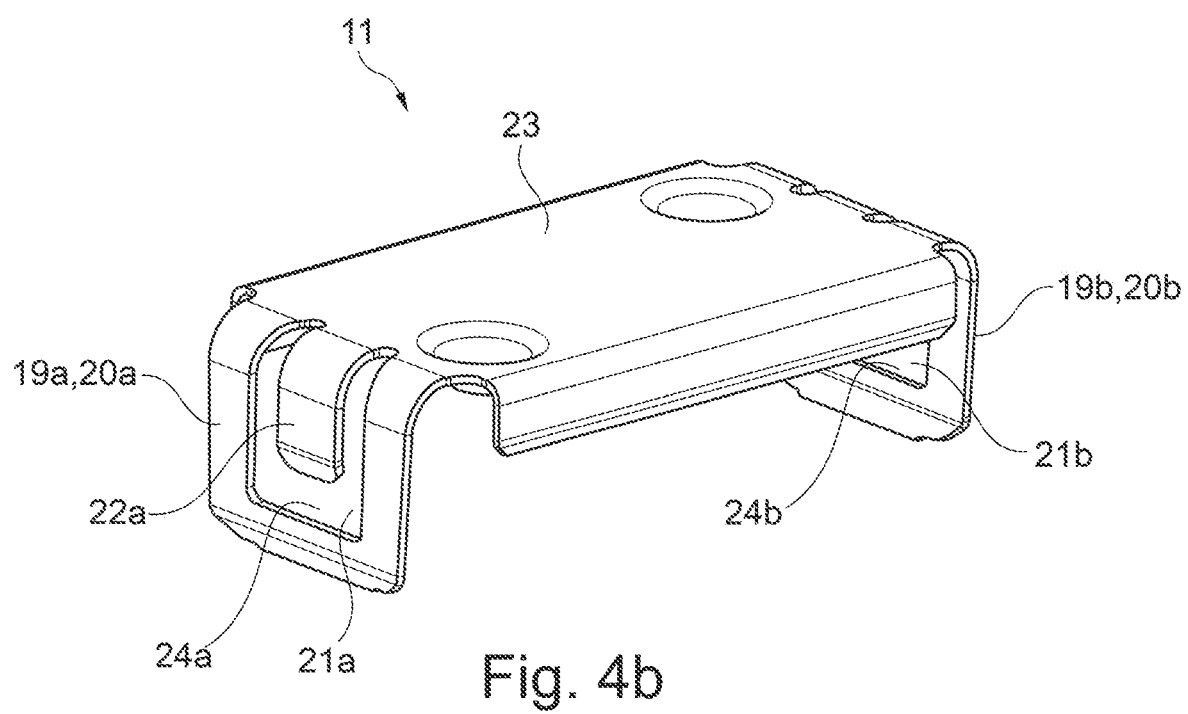

As is clear from FIGS. 4 a, b, which show the cover 11 in a three-dimensional representation, the cover 11 has protrusion receptacles 19 a, b which are configured as U-shaped regions of side portions 20 a, b of the cover 11. In some examples, the protrusion receptacles 19 a, b have an enclosed window region 21 a, b which serves to receive the protrusion portions 16 a, b. In the same direction or parallel to the protrusion receptacles 19 a, b, the cover has two clamping tabs 22 a, b which are arranged in the protrusion receptacles 19 a, b. The protrusion receptacles 19 a, b may be arranged in the same component plane as the clamping tabs 22 a, b.

The side portions 20 a, b are connected to one another via a connecting portion 23, wherein the connecting portion 23 forms a cover region for the cover 11. On the longitudinal sides, the connecting portion 23 has a chamfered region 25 a, b which structurally reinforces the connecting portion 23.

Figure 3:
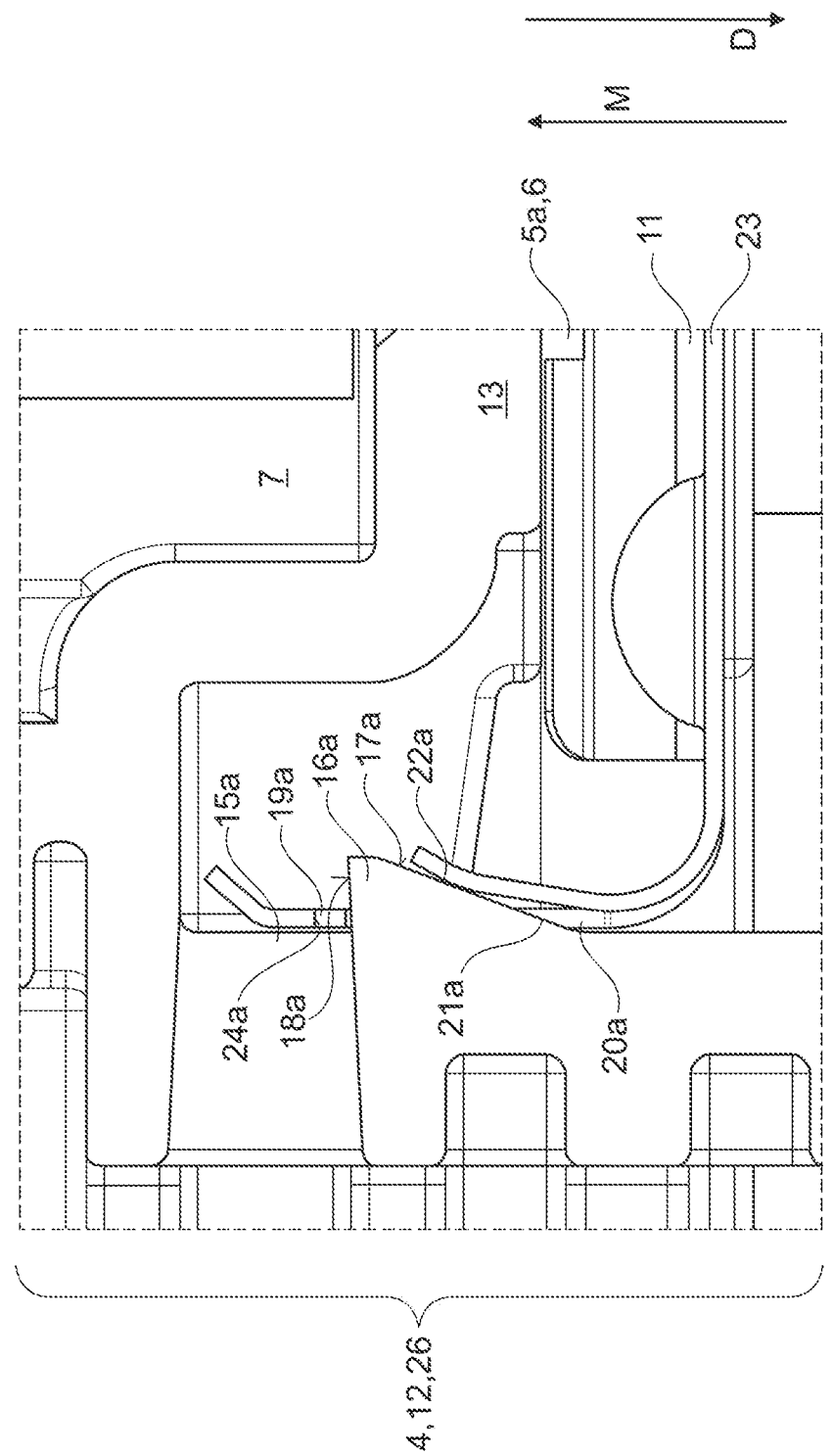
FIG. 3 shows a detail from the sectional diagram of the exemplary pedestrian protection sensor of the preceding figure during the insertion of a cover.

FIG. 3 shows a detailed view during the mounting of the cover 11 in the sensor housing portion 12. During the mounting, the cover 11 is pushed into the sensor housing portion 12 in the mounting direction M, where the side portions 20 a, b lie in a sliding manner against the contacting surfaces 15 a, b. When the cover 11 is slid in, the protrusion receptacles 19 a, b are deflected by the protrusion portions 16 a, b until the protrusion receptacles 19 a, b receive the protrusion portions 16 a, b, as is shown in FIG. 3. In this mounting condition, the protrusion receptacles 19 a, b and/or the side portions 20 a, b snap against the contacting surfaces 15 a, b so that the protrusion portions 16 a, b are interlockingly trapped in the protrusion receptacles 19 a, b.

The cover 11 cannot be slid an arbitrary distance into the sensor housing portion 12, since the chamfered regions 25 a, b act as spacer elements and are supported on the bottom region 13 of the sensor housing portion 12. As a result, a minimum volume remains under the cover 11 so that the membrane device 6 is protected against damage during the mounting. Even if impacts later act on the cover 11, the chamfered regions 25 a, b form spacer elements as protection for the membrane device 6.

The clamping tabs 22 a, b lie against the ramp surfaces 17 a, b and are deflected with respect to one another by the ramp surface 17 a, b. Due to the elastic deformation of the clamping tabs 22 a, b, the cover 11 is preloaded in the removal direction D so that the cover 11 automatically moves in the removal direction D. An extension of the cover 11 is, however, prevented in that a latching complementary surface 24 a, b is, in each case, configured on the transverse leg of the protrusion receptacles 19 a, b, which—as can be inferred from FIG. 2—interlockingly lie against the latching surfaces 18 a, b and form a mechanical end stop for the cover 11 in the removal direction D. Due to the oblique configuration of the latching surfaces 18 a, b in the longitudinal section, the protrusion receptacles 19 a, b are, in addition, pushed onto the contacting surfaces 15 a, b. It is, in addition, preferable that the cover 11 is introduced, preloaded, into the sensor housing portion 12 in the transverse direction to the mounting direction M and/or removal direction D.

The advantage of this structural design is that the cover 11 cannot damage the membrane device 6 during the mounting. The cover 11 is additionally interlockingly held and is preloaded in the removal direction D, where the interlocking connection and the preloading are realized via the interaction of the protrusion portion 16 a, b and side portion 20 a, b.

The cover 11 can be economically configured as a sheet metal part or a shaped sheet metal part and can, for example, be produced from stainless steel. In this design, the cover can be produced by a simple punching and bending process and has reliable elastic properties.

A number of implementations have been described. Nevertheless, it will be understood that various modifications may be made without departing from the spirit and scope of the disclosure. Accordingly, other implementations are within the scope of the following claims.

What is claimed is:

1. A cover assembly for a sensor component, the cover assembly comprising:
   a sensor housing portion having a protrusion portion, the protrusion portion having a ramp surface; and
   a cover including:
   a protrusion receptacle, the protrusion portion arranged in the protrusion receptacle; and a clamping tab preloads the cover in a removal direction,
wherein the protrusion receptacle interlockingly lies against the protrusion portion in a removal direction,
wherein the clamping tab lies on the ramp surface of the protrusion portion, and
wherein the clamping tab is arranged in the protrusion receptacle.

2. The cover assembly according to claim 1, wherein the sensor housing portion has a contacting surface for contacting the protrusion receptacle in a direction vertical to the mounting and/or to the removal direction, wherein the protrusion portion protrudes from the contacting surface.

3. The cover assembly according to claim 2, wherein the protrusion receptacle is preloaded in the direction of the contacting surface so that the protrusion receptacle is pressed against the contacting surface.

4. The cover assembly according to claim 2, further comprising:
   a latching surface arranged on the protrusion portion, and
   a latching complementary surface arranged on the protrusion receptacle,
   wherein the latching surface lies against the latching complementary surface,
   wherein the latching surface forms a ramp or a chute for the latching complementary surface so that, during a movement of the cover in the removal direction, the protrusion receptacle is guided in the direction of the contacting surface.

5. The cover assembly according claim 1, wherein the cover has a spacer element which forms a mechanical end stop for the cover in the sensor housing portion in a mounting direction.

6. The cover assembly according to claim 5, wherein:
   the cover has two side portions and a connecting portion, and
   the side portions are arranged on both sides of the connecting portion and form the protrusion receptacles.

7. The cover assembly according to claim 6, wherein the spacer element is configured on the connecting portion.

8. The cover assembly according to claim 1, wherein the cover is configured as a shaped sheet metal part.

9. A pedestrian protection sensor for a vehicle including a cover assembly that comprises:
   a sensor housing portion having a protrusion portion, the protrusion portion having a ramp surface; and
   a cover including:
      a protrusion receptacle, the protrusion portion arranged in the protrusion receptacle; and
      a clamping tab preloads the cover in a removal direction,
   wherein the protrusion receptacle interlockingly lies against the protrusion portion in the removal direction,
   wherein the clamping tab lies on the ramp surface of the protrusion portion, and
   wherein the clamping r tab is arranged in the protrusion receptacle.

10. The pedestrian protection sensor according to claim 9, further comprising:
    a membrane device arranged in the sensor housing portion and is covered by the cover.

11. The pedestrian protection sensor according to claim 9, wherein the sensor housing portion has a contacting surface for contacting the protrusion receptacle in a direction vertical to the mounting and/or to the removal direction, wherein the protrusion portion protrudes from the contacting surface.

12. The pedestrian protection sensor according to claim 11, wherein the protrusion receptacle is preloaded in the direction of the contacting surface so that the protrusion receptacle is pressed against the contacting surface.

13. The pedestrian protection sensor according to claim 11, wherein the cover assembly further comprises:
    a latching surface arranged on the protrusion portion, and
    a latching complementary surface arranged on the protrusion receptacle,
    wherein the latching surface lies against the latching complementary surface,
    wherein the latching surface forms a ramp or a chute for the latching complementary surface so that, during a movement of the cover in the removal direction, the protrusion receptacle is guided in the direction of the contacting surface.

14. The pedestrian protection sensor according claim 9, wherein the cover has a spacer element which forms a mechanical end stop for the cover in the sensor housing portion in a mounting direction.

15. The pedestrian protection sensor according to claim 14, wherein:
    the cover has two side portions and a connecting portion, and
    the side portions are arranged on both sides of the connecting portion and form the protrusion receptacles.

16. The pedestrian protection sensor according to claim 15, wherein the spacer element is configured on the connecting portion.

17. The pedestrian protection sensor according to claim 9, wherein the cover is configured as a shaped sheet metal part.

* * * * *